United States Patent
Hino et al.

(10) Patent No.: US 7,620,272 B2
(45) Date of Patent: Nov. 17, 2009

(54) PHOTOELECTRIC COMPOSITE MODULE AND OPTICAL INPUT/OUTPUT DEVICE

(75) Inventors: Tomoyuki Hino, Tokyo (JP); Kazuhiko Kurata, Tokyo (JP); Ichiro Ogura, Tokyo (JP); Junichi Sasaki, Tokyo (JP); Ichiro Hatakeyama, Tokyo (JP); Yoichi Hashimoto, Tokyo (JP); Ryosuke Kuribayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/785,946

(22) Filed: Apr. 23, 2007

(65) Prior Publication Data

US 2007/0280594 A1 Dec. 6, 2007

(30) Foreign Application Priority Data

Apr. 25, 2006 (JP) .............................. 2006-120597

(51) Int. Cl.
*G02B 6/12* (2006.01)
*G02B 6/00* (2006.01)

(52) U.S. Cl. ....................................... 385/14; 385/135
(58) Field of Classification Search ................. 439/165; 385/14, 139

See application file for complete search history.

(56) References Cited

U.S. PATENT DOCUMENTS 5,363,089 A * 11/1994 Goldenberg ............... 340/7.63
5,768,456 A * 6/1998 Knapp et al. .................. 385/49
6,901,185 B2   5/2005 Sasaki et al.
7,519,243 B2 * 4/2009 Terada et al. .................. 385/14
2005/0180679 A1   8/2005 Shimizu et al.
2006/0008214 A1* 1/2006 Giboney et al. ............... 385/92

FOREIGN PATENT DOCUMENTS

| JP | 2003-185891 A | 7/2003 |
| JP | 2003-207694 A | 7/2003 |
| JP | 2004-013508 A | 1/2004 |

\* cited by examiner

*Primary Examiner*—Charlie Peng
(74) *Attorney, Agent, or Firm*—Foley & Lardner LLP

(57) ABSTRACT

A photoelectric composite module has an optical device, a package and a flexible printed circuit that is set along both case parts of the package, and electric wiring for the optical device is formed thereon. The package has a first case part and a second case part that is connected with the first case part by a hinge and is set on a mounted board. The optical device is joined with a surface that faces the first case part in said flexible printed circuit. The flexible printed circuit has light extraction means for transmitting an optical signal that should be exchanged between the optical device and the optical waveguide. The package has short-circuiting means for making a short circuit between the electrical wiring of the flexible printed circuit and the electrical wiring of the mounted board.

13 Claims, 7 Drawing Sheets

PHOTOELECTRIC COMPOSITE MODULE AND OPTICAL INPUT/OUTPUT DEVICE

This application is based upon and claims the benefit of priority from Japanese Patent Application No. 2006-120597 filed on Apr. 25, 2006, the content of which is incorporated by reference.

BACKGROUND OF THE INVENTION

1. Field of the Invention

The present invention relates to a photoelectric composite module mounted on a board, between boards or between backplanes of an information appliance such as a router, a server and a storage device.

2. Description of the Related Art

In recent years, the amount of information handled by an information appliance such as a router, a server and a storage device has been increasing dramatically. Accordingly, a limit on the electric transmission capacity in an interconnection, between boards or in a backplane of an information appliance has become obvious. An interconnection technique that uses an optical transmission is a common method in the industry to solve these problems.

A logic LSI configured as a low cost and compact input/output device using an optical interconnection is known in the industry as a means to perform signal processing and to use a photoelectric composite module for an input/output interface. The photoelectric composite module has an optical device, a driver IC and a circuit board for mounting the optical device and the driver IC by flip chip bonding as basic components. In addition to a layer-to-layer wiring formed on the circuit board, a wiring pattern is also formed on both sides of the circuit board.

A conventional technique using such a photoelectric composite module includes those described in the documents below, for example.

Japanese Patent Laid-Open No. 2003-185891 proposes an optical receiving device in which a photoelectric component such as photo electric device 11 and semiconductor device 10 or the like that adjusts the current amplitude of the optical device is implemented on circuit board 14 by a flip-chip bonding as shown in FIG. 2 in the document. The device is fixed by metal bump 18. Optical connectors 15 and 16 are attached to and detached from a fixed device.

Japanese Patent Laid-Open No. 2004-31508 proposes photoelectric composite module 6 in which optical device 61 and driver IC 62 are connected by a flip-chip bonding to electrode 66 on transparent plate 13 on which a wiring pattern is formed. Driver IC 62 is electrically connected to a board mounted with a module via layer-to-layer wiring 69 of transparent plate 63 and a via member. In order to adjust the height of an optical axis according to the height of the rack in which a board is housed, module 4 having optical axis converting device 44 with a mirror as shown in FIG. 4 in the document is also provided.

Japanese Patent Laid-Open No. 2003-207694 proposes an optical module in which V groove 6 for positioning optical fiber array 7 is formed on connector 5 that is attached to package 1 and mirror 9 tilted by 45 degrees is arranged at the end of optical fiber array 7. The light outputted from light emitting device 2 of package 1 is reflected on tilted mirror 9 via lens array 4 and its optical path is bent by 90 degrees and then input into optical fiber array 7 as shown in FIG. 2 in the document.

Because optical connectors 15 and 16 are attached or detached to and from a device fixed to the board or the like according to the technique described in Japanese Patent Laid-Open No. 2003-185891, a channel for attaching and detaching them needs to be previously reserved on the board. Therefore, other electric components cannot be arranged on the channel for attaching and detaching optical connectors 15 and 16. From the standpoint of the implement layout, it is not desirable that such a dead space be present on a board.

Because via member 69 intervenes in an electric connection between driver IC for input and output 62 and the mounted board according to the technique described in Japanese Patent Laid-Open No. 2004-31508, a high frequency property may be degraded. Since the direction to which heat is released from the optical device and the driver IC is limited toward the board on which they are mounted, the layout on the board is not simple.

The techniques described in FIG. 4 of Japanese Patent Laid-Open No. 2004-31508 and Japanese Patent Laid-Open No. 2003-207694 require optical path converting means by a mirror or an optical coupling means by a lens between an optical connector to be attached or detached and a light receiving/emitting element. This leads to a problem in which the number of members and the number of processes are increased, and this raises the cost of implementation.

SUMMARY OF THE INVENTION

An object of the present invention is to provide a photoelectric composite module that can reduce dead space in relation to attaching and detaching an optical connector to and from a board on which a photoelectric composite module is mounted.

The photoelectric composite module according to an aspect of the present invention includes an optical device for exchanging an optical signal with an optical waveguide, a package with a first case part and a second case part that is connected to the first case by a hinge and is set on a mounted board, and a flexible printed circuit that is set along both case parts of the package, and electric wiring for the optical device is formed thereon. The optical device is joined with a surface facing the first case part in the flexible printed circuit. The flexible printed circuit has light extraction means for transmitting an optical signal that should be exchanged between the optical device and the optical waveguide. The package has short-circuiting means for making a short circuit between the electrical wiring of the flexible printed circuit and the electrical wiring of the mounted board.

Attaching and detaching the optical waveguide to and from a photoelectric composite module having the above configuration can be performed when a hinge of the package is opened, i.e., the first case part is tilted to be horizontal to the second case part. Therefore, the optical waveguide can be vertically attached or detached to or from the mounted board. Therefore, since a channel for attaching and detaching optical connectors is not included in the area around the photoelectric composite module, a space for the channel needs not to be previously reserved on the mounted board. That reduces the dead space on the board.

The above and other objects, features and advantages of the present invention will become apparent from the following description with reference to the accompanying drawings which illustrate examples of the present invention.

DETAILED DESCRIPTION OF THE PREFERRED EMBODIMENTS

This application is based upon and claims the benefit of priority from Japanese Patent Application No. 2006-120597 filed on Apr. 25, 2006, the content of which is incorporated by reference.

Figure 1:
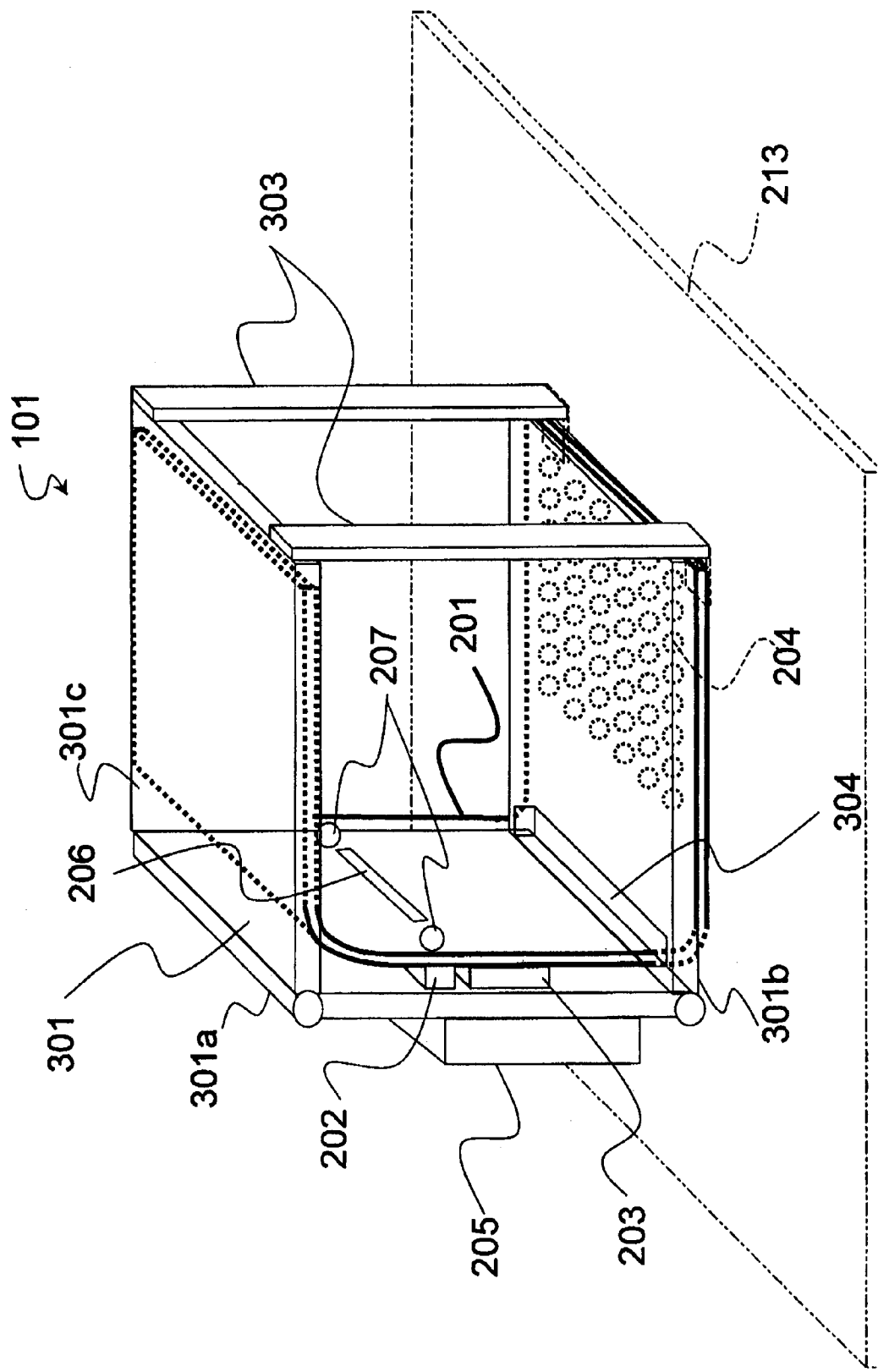
FIG. 1 is an oblique diagram schematically showing a first embodiment of a photoelectric composite module according to the present invention.
Figure 2:
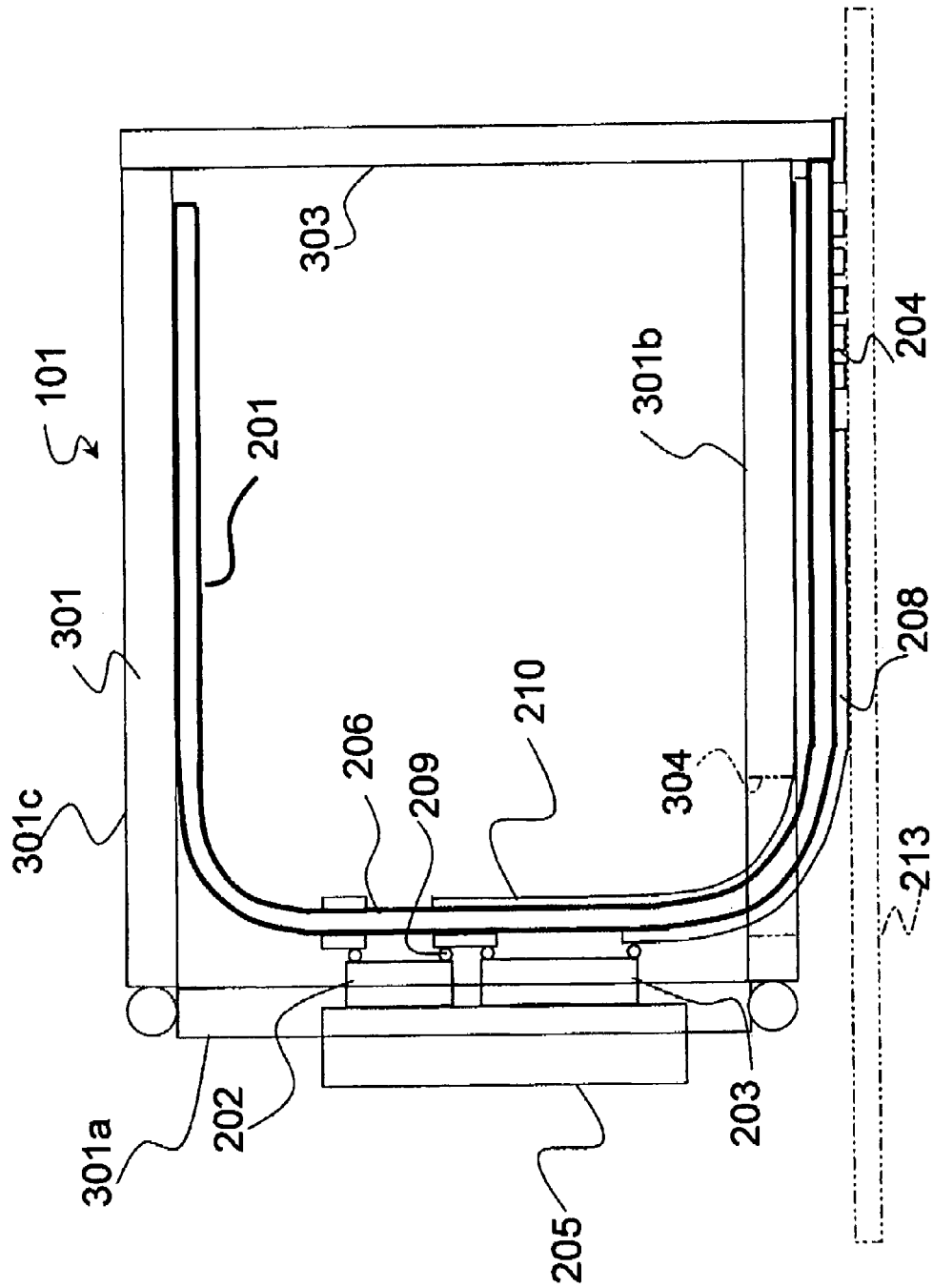
FIG. 2 is a schematic cross-sectional diagram of the photoelectric composite module of the first embodiment.
Figure 3:
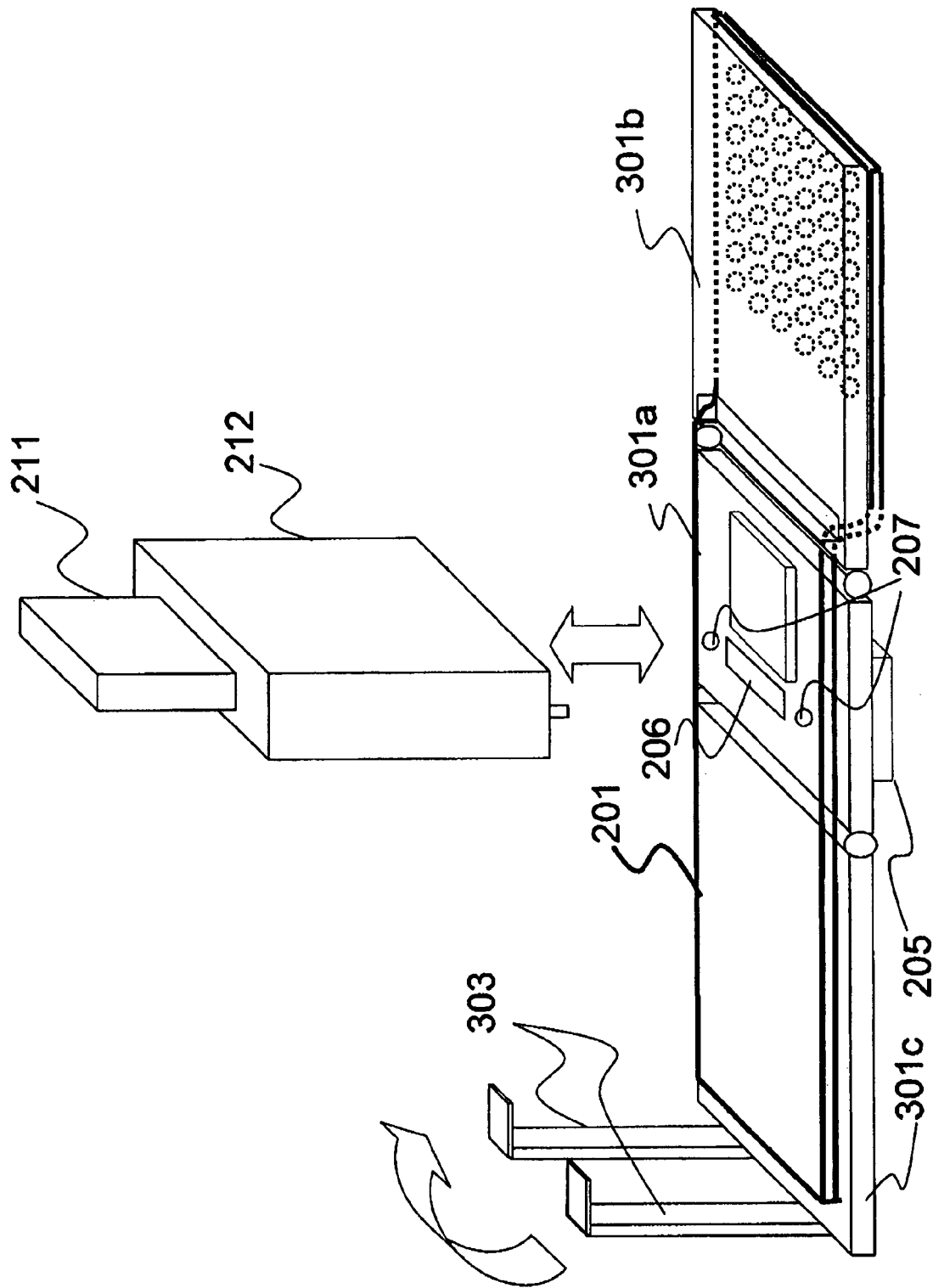
FIG. 3 is an illustration of an optical connector that connects to the photoelectric composite module of the first embodiment.
Figure 4:
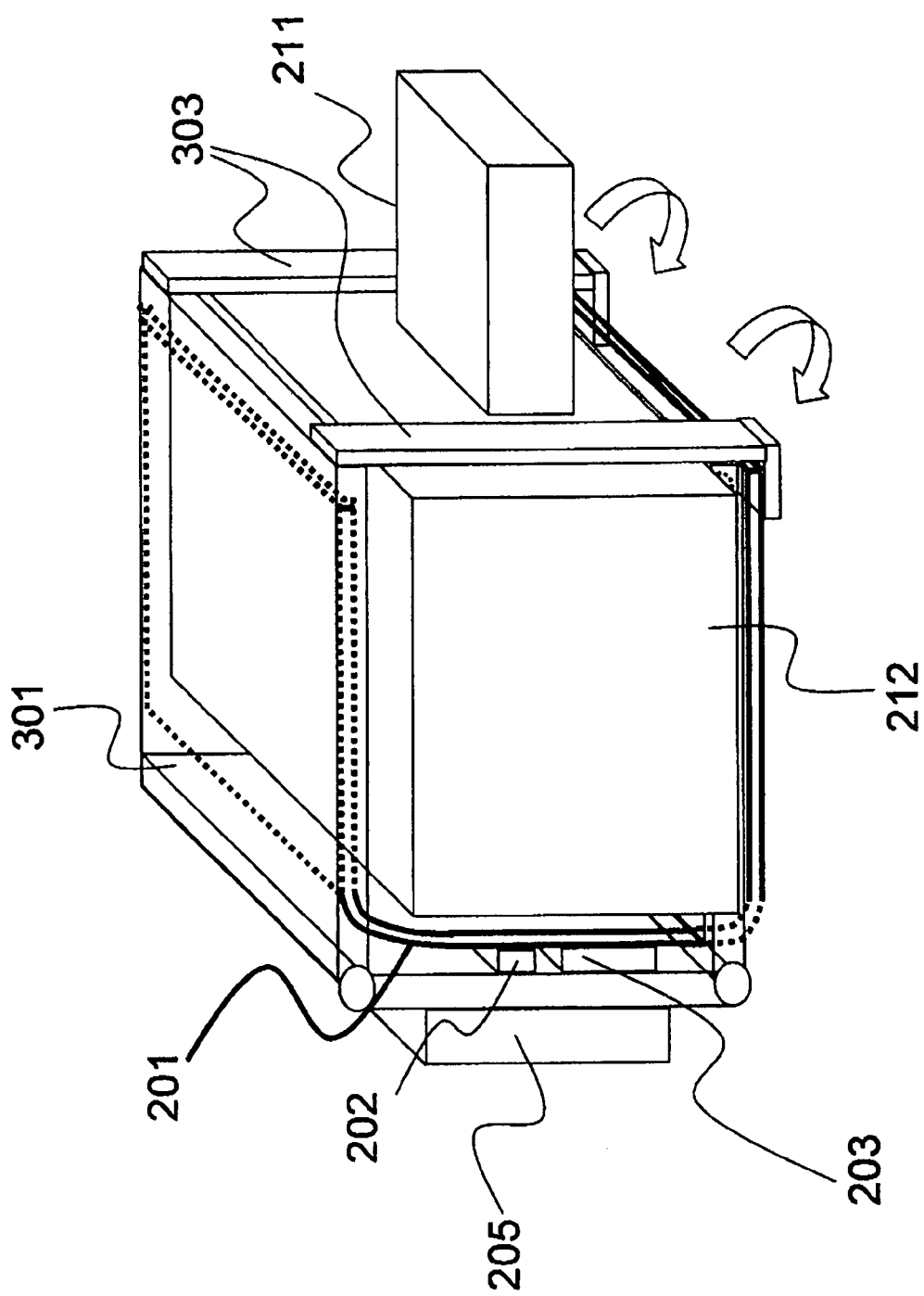
FIG. 4 is a schematic oblique diagram showing a case where the optical connector is mounted on the photoelectric composite module of the first embodiment.

FIG. 1 is a schematic oblique diagram showing a configuration of the first embodiment of the photoelectric composite module according to the present invention. FIG. 2 is a schematic cross sectional diagram of the module. FIG. 3 shows a procedure of mounting an optical connector that forms an optical waveguide to the module. FIG. 4 is a schematic oblique diagram after the optical connector is mounted. With reference to FIG. 1 to FIG. 4, photoelectric composite module 10 of the first embodiment will be described.

Photoelectric composite module 101 has package 301 that is mounted on module mounted board 213. Package 301 has flat plate 301b that is attached to module mounted board 213, flat plate 301a connected to flat plate 301b by a hinge and flat plate 301c connected to flat plat 301a and attached with fixing jigs 303 to be described later. Flat plate 301a faces a first case part in the present invention, flat plate 301b faces a second case part, and flat plate 301c faces a third case part. The hinges of package 301 shown in FIG. 1 are closed.

Fixing jigs 303 are attached to flat plat 301c of package 301. Hook parts of fixing jigs 303 in the figure are sandwiched between module mounted board 213 and plate 301b. The shape of fixing jigs 303 is not limited to such a hook shape as shown in the figure and any shape may be used provided that its only function is to maintain the state shown in FIG. 1. For example, it may be fixed by pin or a latch may be formed on the package.

Photoelectric composite module 101 has flexible printed circuit 201 mounted along respective flat plates 301a, 301b and 301c of package 301. Photonic device 202 and input/output IC 203 for controlling photonic device 202 are mounted on flexible base plate 201. Heat sink 205 is attached on the backside of photonic device 202 and input/output IC 203.

Flexible base plate 201 has light ejecting part 206 for transmitting light exchanged between photonic device 202 and optical transmission line 211, alignment marker 207 for guiding the loading position of optical connector 212, electrode 208 and electrode 210 which are electric wiring for electrically connecting photonic device 202 and input/output IC 203 to module mounted board 213.

As shown in FIG. 2, photonic device 202 is implemented by flip chip bonding with metal bump 209 at a position where photonic device 202 is aligned with light ejecting part 206. Input/output IC 203 is also implemented by flip chip bonding near photonic device 202.

Light ejecting part 206 is a part of flexible printed circuit 201 surrounded by electrode 208 and electrode 210, i.e., a part of the flexible printed circuit. Because part of flexible printed circuit 201 serves as light ejecting part 206, optical coupling means such as a lens need not be provided between photonic device 202 and optical transmission line 211. Since they are not needed, the number of members of a module and the number of processes are reduced. That reduces the implementing cost.

Flexible printed circuit 201 is desirably configured by using materials of silicon series, epoxy series or polyimide series that have high transparency across the wavelength range of photonic device 202 and such flexibility as to be able to be bent about 90 degrees. Electrode 208 and electrode 210 formed on flexible printed circuit 201 are formed by using a lithography technique after a film made of the electrode materials is formed on the flexible printed circuit.

Photonic device 202 is a conventionally known light emitting element or light receiving element that has a flat shape, with a plurality of elements being arranged on it in the array shape. If photonic device 202 is used as the light emitting element, input/output IC 203 serves as a driver IC. In such a case, driver IC 203 gives an electronic amplitude required for driving photonic device 202 to light emitting element 202 according to the modulation signal of a defined voltage supplied from the outside. If photonic device 202 is used as the light receiving element, input/output IC 203 serves as an electrical amplifying IC. Electrical amplifying IC 203 converts the light detected by photonic device 202 into a defined voltage and outputs it to the outside.

Electrode 208 connected to photonic device 202 and input/output IC 203 serves as an electrical connection mainly between photonic device 202 and input/output IC 203 and between input/output IC 203 and module mounted board 213. Electrode 208 is formed for performing highly accurate alignment between photonic device 202 and input/output IC 203 when they are implemented by flip chip bonding with metal bump 209. The other electrode 210 is formed to serve as part of an electromagnetic shield by acting as an earthed electrode. That provides shielding effect without using an expensive metal package.

Flexible printed circuit 201 is housed in package 301 along flat plate 301c to flat plat 301a as shown in FIG. 2 and is also ejected outside package 301 through slit 304 of flat plate 301b, i.e., to the side of module mounted board 213. Electrode pad 204 for electrically connecting flexible printed circuit 201 and module mounted board 213 at the bottom of flat plate 301b is provided therebetween.

When optical connector 212 is loaded to or removed from photoelectric composite module 101, only the hinges of package 301 need to be opened as shown in FIG. 3. More specifically, flat plate 301c and flat plate 301a horizontally open over flat plate 301b as shown in FIG. 3 by drawing fixing jigs 303 from the bottom of flat plate 301b of package 301 closed as shown in FIG. 1 and by opening each hinge. In that state, optical connector 212 is attached to or detached from flat plat 302a in a vertical direction.

Therefore, because the direction for attaching and detaching optical connector 212 is vertical to module mounted board 213, it is not necessary to provide a space in the direction for optical transmission line 211 extending near photoelectric composite module 101.

After optical connector 212 is loaded in the state shown in FIG. 3, each hinge closes as shown in FIG. 4. Since the hook part of fixing jigs 303 is tucked at the bottom of package 301, flat plate 301a contacting with photonic device 202 is fixed at an almost vertical position to flat plate 301b, and optical connector 212 is fixed in a state that optical connector 212 is wrapped by package 301. Package 301 is fixed in a state that stress (shrinking stress and stretching stress) applied to flexile printed circuit 201 is a minimum.

Therefore, the direction of inputting and outputting light can be maintained horizontal against module mounted board 213 without using any optical axis converting means such as a mirror. Because it is adapted to cover optical connector 212, the entire module can be downsized.

As an example of operations of photoelectric composite module 101, a case where photonic device 202 is a light emitting element will be described. An electric logical signal of a defined voltage is supplied to driver IC 203 from module mounted board 213 through electrode pad 204 and electrode 208. At the same time, a ground voltage is supplied to driver IC 203 via electrode 204 of the flexile printed circuit. Then, a current that has an amplitude required for driving light emitting element 202 and that corresponds to an external electric signal flows from driver IC 203 to light emitting element 202. Then, an optical signal is emitted from light emitting element 202 according to the current, and the optical signal is coupled with light transmission line 211 of optical connector 212 via light ejecting part 206.

A fiber array, a fiber sheet that is formed by a fiber array wrapped in laminate materials, or the like can be used, as light transmission line 211 that is optically coupled with photoelectric composite module 101. The quality of material can be a polyimide series or a Si series.

As mentioned above, according to the embodiment, optical connector 212 can be vertically attached to or detached from module mounted board 213. Since a detaching/attaching channel is not included in the area around photoelectric composite module 101, space for the channel for attaching and detaching the optical connectors need not be previously reserved on module mounted board 213. That can reduce the dead space on the board.

Because optical connector 212 loaded on photoelectric composite module 101 is horizontally fixed to the board, it is useful for connecting optical transmission line 211 and electric components on the board. Since flexible printed circuit 201 is adapted to be ejected from slit 304 onto the board as shown in FIG. 2, there will be a good connection between electrodes 208 and 210 of photonic device 202 and IC for input and output 203 with an electrode of the board. That can prevent degradation of the high frequency property.

A photoelectric composite module with a simple design for heat release of an element can also be realized. This is because it is adapted such that photonic device 202 and an IC for input and output 203 is vertically fixed to module mounted board 213 to cause the board to horizontally release heat.

Figure 5:
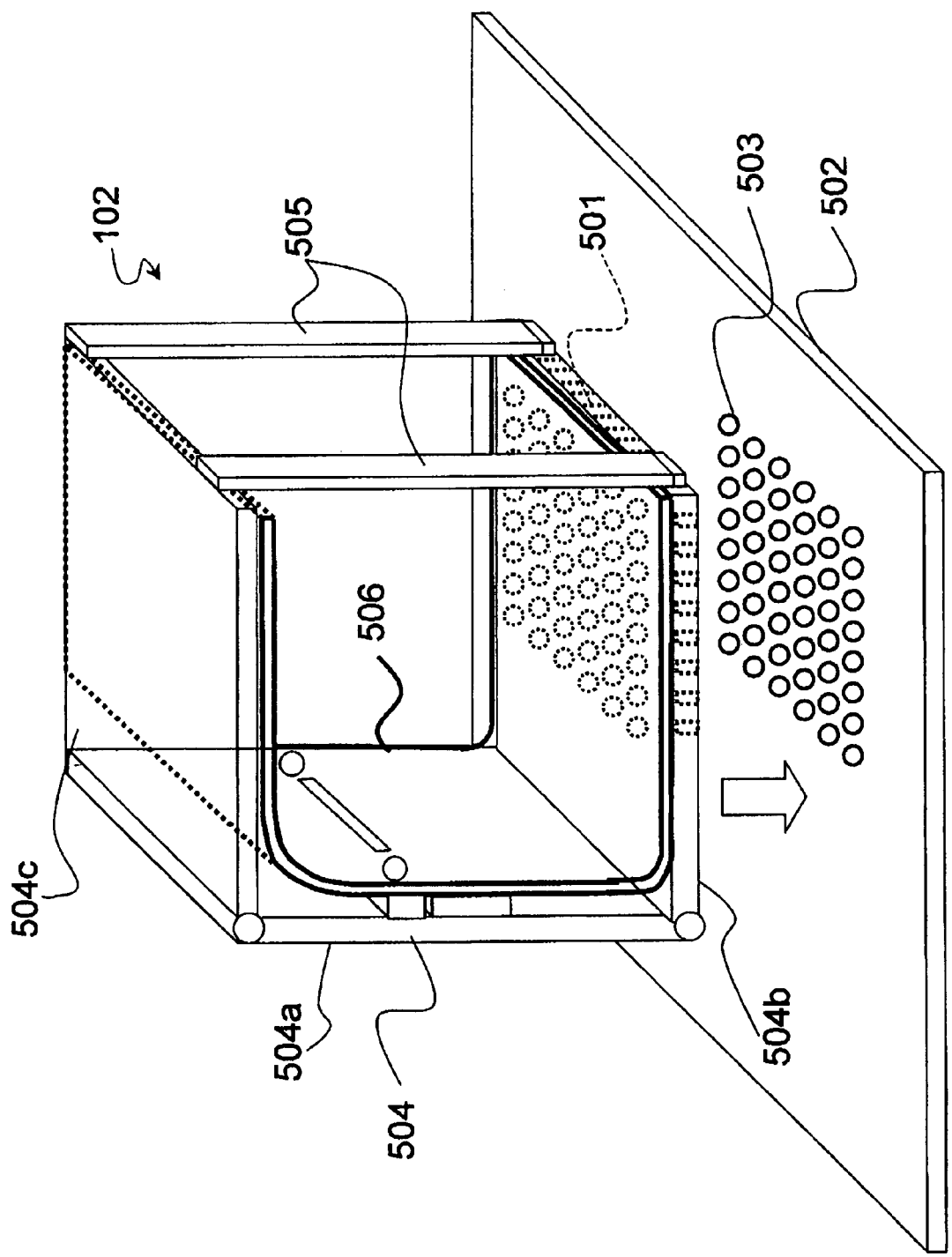
FIG. 5 is an oblique diagram schematically showing a second embodiment of the photoelectric composite module according to the present invention.

FIG. 5 shows a configuration of the second embodiment of the photoelectric composite module. Photoelectric composite module 102 of the embodiment has package 504 with flat plate 504a, flat pate 504b and flat plate 504c connected with flat plate 504a by a hinge. Fixing jigs 505 are attached to flat plate 504c.

Flexible printed circuit 506 of the embodiment is housed in package 504 along each flat plate 504a, 504b and 504c as shown in FIG. 5. As such, via 501, as a short-circuiting means between flexible printed circuit 506 and mounted board 502, is formed on flat plate 504b set on mounted board 502. Via 501 is a conductive member fed through flat plate 504b and via 501 is arranged to be aligned with pad pattern 503 of the electrode of mounted board 502.

A procedure of attaching or detaching the optical connector to or from photoelectric composite module 102 and the electrical effects are the same as those of the first embodiment, thus, they will be omitted from the description.

To enable better contact with flat plat 504b of package 504 and mounted board 502, fixing jigs 505 may be pins that are fixed to the side of flat plate 504b. If some object in the shape of a hook such as the abovementioned fixed jig 303 is applied to photoelectric composite module 102, it is desirable to form a groove on the bottom of flat plate 504b that is in contact with mounted board 502 so that the hook shaped parts can be housed in the groove. That is to say, package 504 may be adapted so that no convexity is created on the bottom of flat plate 504b that is connected to mounted board 502.

In order to match via 501 of package 504 and pad pattern 503 on mounted board 502, a mechanism for converting a pit of pad pattern 503 may be added.

As mentioned above, the embodiment shown in FIG. 5 also eliminates the requirement of previously reserving space for the channel for attaching/detaching the optical connector on module mounted board 502. That can reduce the dead space on the board.

Figure 6:
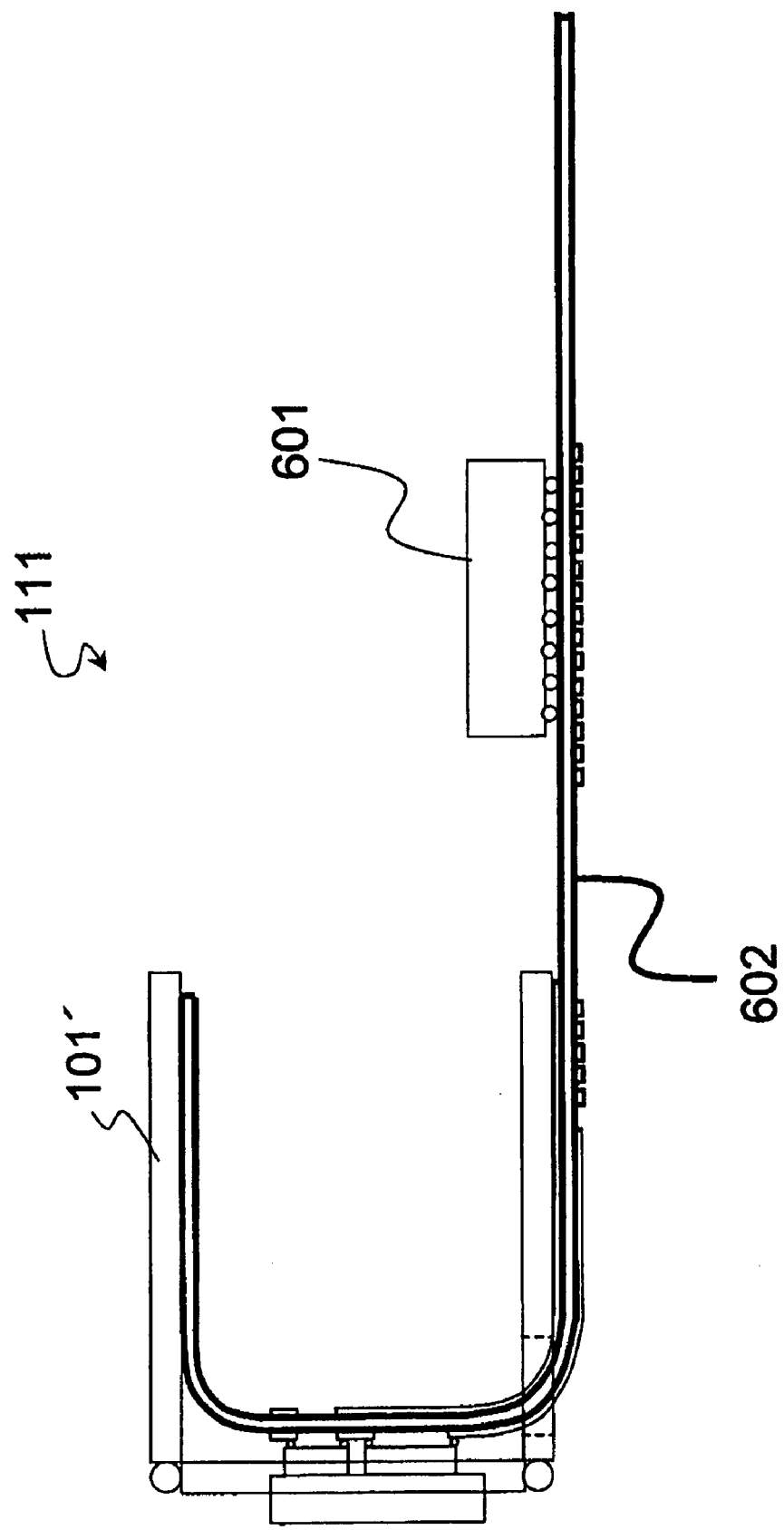
FIG. 6 is a schematic cross-sectional diagram of the first embodiment of an optical input/output device according to the present invention.

Now, an embodiment of the input/output device that uses the abovementioned photoelectric composite module 101 (102) will be described. FIG. 6 shows a configuration of the first embodiment of the light input/output device. Light input/output device 111 of the embodiment has photoelectric composite module 101' which is the same as photoelectric composite module 101 shown in FIG. 1 and logic LSI 601 which is mounted on flexible printed circuit 602 extending from module 101'. As photoelectric composite module 101', photoelectric composite module 102 as shown in FIG. 5 may be used instead of that shown in FIG. 1.

Logic LSI 601 is a LSI for controlling an input/output signal of photoelectric composite module 101'. For making an electrical connection between logic LSI 601 and photoelectric composite module 101', flexible printed circuit 602 can be used. Although photoelectric composite module 101' is described in the configuration shown in FIG. 6, there may be a plurality of module 101'.

Figure 7:
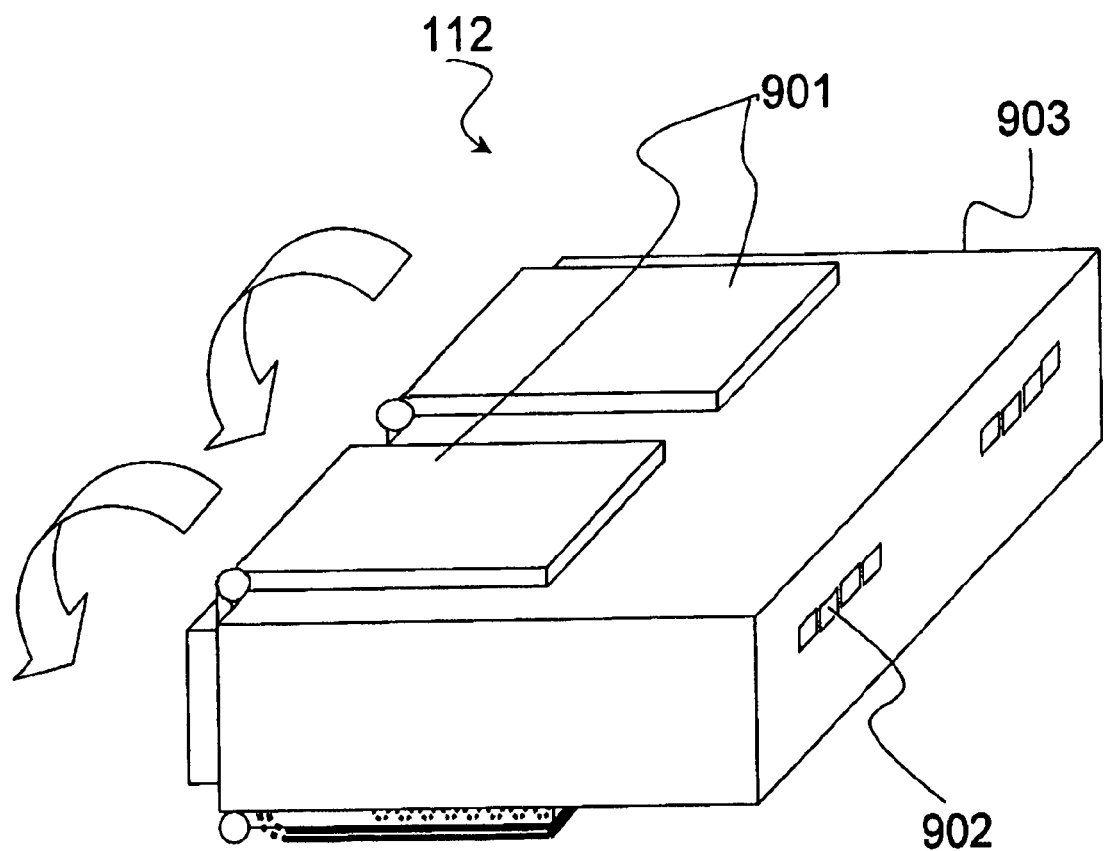
FIG. 7 is a schematic cross-sectional diagram of the second embodiment of the optical input/output device according to the present invention.

FIG. 7 shows the second embodiment of the light input/output device. Light input/output device 112 has a plurality of photoelectric composite modules 901 and sub board 903, on which optical waveguide 902 is formed. Photoelectric module 901 is the same as abovementioned photoelectric composite module 101 or photoelectric composite module 102 from which fixing jigs 305 and 505 have been eliminated.

Sub board 903 is clipped on photoelectric composite module 901. Sub board 903 can be attached or removed by opening the hinge of each photoelectric composite module 901.

Light input/output device 112 of the embodiment serves to rewire or arrange a channel of the optical signal in the array because each of photoelectric composite modules 901 that corresponds to communication channel are different from each other, and sub board basal board 903 exchange the optical signal.

According to the embodiment shown in FIG. 7, even if an object that is to be optically connected with an optical device is relatively big, such as sub board 903, and needs to be attached to a plurality of photo electric composite modules 901, the object can be easily attached to or detached from the optical device by opening and closing the hinge.

Although the package of each embodiment has three flat plates, a package may be formed with two flat plates corresponding to the first case part and the second case part according to the present invention. That is to say, in the configuration shown in FIG. 1, for example, flat plate 301c with fixing jigs 303 attached is omitted. In that case, for example, with jigs are provided as fixing means and positioned from both sides of flat plate 301a to both sides of flat plate 301b, stability of the package can be improved because the hinges are closed.

While exemplary embodiments of the present invention have been described using specific terms, such a description is for illustrative purposes only, and it is to be understood that changes and variations may be made without departing from the spirit or scope of the following claims.

What is claimed is:

1. A photoelectric composite module comprising:
   an optical device for exchanging an optical signal with an optical waveguide,
   a package with a first case part and a second case part, and
   a flexible printed circuit that is set along both said first and second case parts of said package wherein
   said second case part is set on a mounted board and connected with said first case part by a hinge,
   said flexible printed circuit has electrical wiring for said optical device and light extraction means for transmitting an optical signal that should be exchanged between said optical device and said optical waveguide,
   said optical device is mounted on a surface, facing said first case part, of said flexible printed circuit, and
   said package has short-circuiting means for making a short circuit between the electrical wiring of said flexible printed circuit and electrical wiring of a mounted board.

2. The photoelectric composite module according to claim 1, wherein said package further comprises fixing means for substantially vertically fixing said first case part to said second case part.

3. The photoelectric composite module according to claim 1, wherein said short-circuiting means is a slit for feeding said flexible printed circuit through said second case part, and the electric wiring of said flexible printed circuit is connected with the electric wiring of the mounted board via said slit.

4. The photoelectric composite module according to claim 1, wherein said short-circuiting means is a via mechanism formed in said second case part, and the electric wiring of said flexible printed circuit is connected with the electric wiring of the mounted board via said via mechanism.

5. The photoelectric composite module according to claim 2, further comprising a third case part connected with said first case part by a hinge, wherein said fixing means comprises a supporting member for substantially horizontally fixing said second case part and said third case part via said third case part.

6. The photoelectric composite module according to claim 1, wherein said light extraction means is a part of said flexible printed circuit on which regions are defined by the electric wiring of said optical device, and is made of materials that have high transparency across a wavelength range of said optical device.

7. The photoelectric composite module according to claim 1, wherein said optical device is a light emitting element.

8. The photoelectric composite module according to claim 1, wherein said optical device is a light receiving element.

9. The photoelectric composite module according to claim 2, wherein said flexible printed circuit has a shape that produces minimum stress when said package is fixed by said fixing means.

10. An optical input/output device comprising a photoelectric composite module recited in claim 1 and a logic integrated circuit that is mounted on the flexible printed circuit of said photoelectric composite module and controls an electric signal of said photoelectric composite module.

11. An optical input/output device comprising a plurality of photoelectric composite modules each of which is a photoelectric composite module recited in claim 1 that is allocated a communication channel different from the communication channels of the other photoelectric composite modules, and an optical waveguide device with a plurality of optical waveguides loaded on said plurality of photoelectric composite modules in parallel.

12. The photoelectric composite module according to claim 6, wherein said light extraction means is made of materials of silicon series, epoxy series or polyimide series.

13. The photoelectric composite module according to claim 6, wherein said light extraction means is made of material which is flexible so as to be bendable.

* * * * *